United States Patent
Lacouture Parodi et al.

(10) Patent No.: US 11,776,532 B2
(45) Date of Patent: Oct. 3, 2023

(54) AUDIO PROCESSING APPARATUS AND METHOD FOR AUDIO SCENE CLASSIFICATION

(71) Applicant: HUAWEI TECHNOLOGIES CO., LTD., Shenzhen (CN)

(72) Inventors: Yesenia Lacouture Parodi, Munich (DE); Florian Eyben, Gilching (DE); Andrea Crespi, Gilching (DE); Jun Deng, Gilching (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 17/348,129

(22) Filed: Jun. 15, 2021

(65) Prior Publication Data

US 2021/0312912 A1 Oct. 7, 2021

Related U.S. Application Data

(63) Continuation of application No. PCT/EP2018/086555, filed on Dec. 21, 2018.

(51) Int. Cl.
*G10L 15/16* (2006.01)
*G06N 3/04* (2023.01)
(Continued)

(52) U.S. Cl.
CPC .......... *G10L 15/16* (2013.01); *G06N 3/04* (2013.01); *G10L 25/30* (2013.01); *G10L 25/51* (2013.01)

(58) Field of Classification Search
CPC .......... G10L 15/16; G10L 25/30; G10L 25/51
(Continued)

(56) References Cited

U.S. PATENT DOCUMENTS

| 6,910,013 B2 | 6/2005 | Allegro et al. |
| 8,948,428 B2 | 2/2015 | Kates |

(Continued)

FOREIGN PATENT DOCUMENTS

| CN | 102237085 A | 11/2011 |
| CN | 104078050 A | 10/2014 |

(Continued)

OTHER PUBLICATIONS

H. Phan, L. Hertel, M. Maass, P. Koch, R. Mazur and A. Mertins, "Improved Audio Scene Classification Based on Label-Tree Embeddings and Convolutional Neural Networks," in IEEE/ACM Transactions on Audio, Speech, and Language Processing, vol. 25, No. 6, pp. 1278-1290, Jun. 2017, doi: 10.1109/TASLP.2017. (Year: 2017).*

(Continued)

*Primary Examiner* — Bharatkumar S Shah
(74) *Attorney, Agent, or Firm* — HAUPTMAN HAM, LLP

(57) ABSTRACT

The disclosure relates to an audio processing apparatus (200) configured to classify an audio signal into one or more audio scene classes, the audio signal comprising a component signal. The apparatus (200) comprises: processing circuitry configured to classify the component signal of the audio signal as a foreground layer component signal or a background layer component signal; obtain an audio signal feature on the basis of the audio signal; select, depending on the classification of the component signal, a first set of weights or a second set of weights; and to classify the audio signal on the basis of the audio signal features, the foreground layer component signal or the background layer component signal and the selected set of weights.

20 Claims, 7 Drawing Sheets

(51) Int. Cl.
      *G10L 25/30*      (2013.01)
      *G10L 25/51*      (2013.01)
(58) Field of Classification Search
      USPC .......................................................... 704/202
      See application file for complete search history.

(56) References Cited

U.S. PATENT DOCUMENTS

| | | | |
|---|---|---|---|
| 9,454,958 | B2* | 9/2016 | Li ........................... G10L 15/16 |
| 2001/0044719 | A1 | 11/2001 | Casey |
| 2004/0002838 | A1* | 1/2004 | Oliver .................. G06V 30/274 |
| | | | 703/2 |
| 2007/0183604 | A1* | 8/2007 | Araki ...................... G10L 17/26 |
| | | | 381/17 |
| 2016/0111108 | A1* | 4/2016 | Erdogan ............. G10L 21/0324 |
| | | | 704/226 |
| 2020/0265864 | A1* | 8/2020 | Markovic ............... G10L 25/18 |

FOREIGN PATENT DOCUMENTS

| | | |
|---|---|---|
| CN | 108766419 A | 11/2018 |
| JP | 2015015618 A | 1/2015 |
| WO | 2018199997 A1 | 11/2018 |
| WO | 2019086118 A1 | 5/2019 |

OTHER PUBLICATIONS

A. Chen, Q. He, X. Wang and Y. Li, "Home security surveillance based on acoustic scenes analysis," 2017 10th International Congress on Image and Signal Processing, BioMedical Engineering and Informatics (CISP-BMEI), Shanghai, China, 2017, pp. 1-5, doi: 10.1109/CISP-BMEI.2017.8302127. (Year: 2017).*

Huy Phan et al, Enabling Early Audio Event Detection With Neural Networks, Apr. 6, 2019, total 5 pages.

Rui Cai et al., A Flexible Framework for Key Audio Effects Detection and Auditory Context Inference, IEEE Transactions on Audio, Speech, and Language Processing, vol. 14, No. 3, May 2006, total 14 pages.

Jiaxing Ye, et al, Acoustic Scene Classification based on Sound Textures and Events, MM 15, Oct. 26-30, 2015, Brisbane, Australia, total 4 pages.

Daniele Barchiesi et al, Acoustic Scene Classification, Classifying environments from the sounds they produce, IEEE Signal Processing Magazine, May 2015, total 19 pages.

Soo Hyun Bae et al, Acoustic Scene Classification Using Parallel Combination of LSTM and CNN, Detection and Classification of Acoustic Scenes and Events 2016, Sep. 3, 2016, Budapest, Hungary, total 5 pages.

Juhan Nam et al, Acoustic Scene Classification Using Sparse Feature Learning and Selective Max-Pooling By Event Detection, IEEE AASP Challenge on Detection and Classification of Acoustic Scenes and Events, 2013, total 3 pages.

Victor Bisot et al, Acoustic Scene Classification With Matrix Factorization for Unsupervised Feature Learning, ICASSP 2016, total 5 page.

Yong Xu et al, Attention and Localization based on a Deep Convolutional Recurrent Model for Weakly Supervised Audio Tagging, Mar. 17, 2017, total 5 pages.

Regunathan Radhakrishnan et al., Audio Analysis for Surveillance Applications, 2005 IEEE Workshop an Applications of Signal Processing to Audio and Acoustics, Oct. 16-19, 2005, New Paltz, NY, total 4 pages.

Tong Zhang et al, Audio Content Analysis for Online Audiovisual Data Segmentation and Classification, IEEE Transactions on Speech and Audio Processing, vol. 9, No. 4, May 2001, total 17 pages.

Toni Heittola et al, Audio Context Recognition Using Audio Event Histograms, 18th European Signal Processing Conference (EUSIPCO-2010), Aalborg, Denmark, Aug. 23-27, 2010, total 5 pages.

Huy Phan et al, Audio Scene Classification with Deep Recurrent Neural Networks, Jun. 5, 2017, total 5 pages.

Antti J. Eronen et al, Audio-Based Context Recognition, IEEE Transactions on Audio, Speech, and Language Processing, vol. 14, No. 1, Jan. 2006, total 9 pages.

Robert G. Malkin et al, Classifying User Environment for Mobile Applications Using Linear Autoencoding of Ambient Audio, ICASSP 2005, total 4 pages.

Lie Lu et al., Content Analysis for Audio Classification and Segmentation, IEEE Transactions on Speech and Audio Processing, vol. 10, No. 7, Oct. 2002, total 13 pages.

Yong Xu et al., Convolutional Gated Recurrent Neural Network Incorporating Spatial Features for Audio Tagging, Feb. 24, 2017, total 6 pages.

Emre Cakir et al, Convolutional Recurrent Neural Networks for Polyphonic Sound Event Detection, Feb. 21, 2017, total 13 pages.

Jun Deng et al, Deep Neural Networks for Anger Detection from Real Life Speech Data, 2017 Seventh International Conference on Affective Computing and Intelligent Interaction Workshops and Demos (ACIIW), total 6 pages.

Gerard Roma et al, Ecological Acoustics Perspective for Content-Based Retrieval of Environmental Sounds, Hindawi Publishing Corporation, EURASIP Journal on Audio, Speech, and Music Processing, vol. 2010, Article ID 960863, total 11 pages.

Selina Chu et al., Environmental Sound Recognition Using MP-Based Features, ICASSP 2008, total 4 pages.

Alain Rakotomamonjy et al., Histogram of Gradients of Time Frequency Representations for Audio Scene Classication, IEEE/ACM Transactions on Audio, Speech, and Language Processing, vol. 23, No. 1, Jan. 2015, total 12 pages.

Daniel P.W. Ellis et al, Minimal-Impact Audio-Based Personal Archives, CARPE 04, Oct. 15, 2004, New York, New York, USA, total 8 pages.

Juan P. Bello et al., On the Use of Phase and Energy for Musical Onset Detection in the Complex Domain, IEEE Signal Processing Letters, vol. 11, No. 6, Jun. 2004, total 5 pages.

Simon Dixon, Onset Detection Revisited, Proc. of the 9th Int. Conference on Digital Audio Effects (DAFx'06), Montreal, Canada, Sep. 18-20, 2006, total 6 pages.

Jurgen T. Geiger et al., Recognising Acoustic Scenes With Large-Scale Audio Feature Extraction and SVM, IEEE AASP Challenge on Detection and Classification of Acoustic Scenes and Events, 2013, total 3 pages.

Giambattista Parascandolo et al, Recurrent Neural Networks for Polyphonic Sound Event Detection in Real Life Recordings, Apr. 4, 2016, Proc. ICASSP2016, Mar. 20-25, 2016, Shanghai, China, total 5 pages.

Shiwen Deng et al., Robust Minimum Statistics Project Coefficients Feature for Acoustic Environment Recognition, 2014 IEEE International Conference on Acoustic, Speech and Signal Processing (ICASSP), total 5 pages.

Ozlem Kalinli et al, Saliency-Driven Unstructured Acoustic Scene Classi cation Using Latent Perceptual Indexing, MMSP 09, Oct. 5-7, 2009, Rio de Janeiro, Brazil, total 6 pages.

Nitin Sawhney et al., Situational Awareness from Environmental Sounds, Speech Interface Group, MIT Media Lab, Final Project Report for Modeling Adaptive Behavior (MAS 738) Pattie Maes, Jun. 13, 1997, total 8 pages.

Waldo Nogueira, Sound Scene Identification Based on Monaural and Binaural Features, Detection and Classification of Acoustic Scenes and Events 2016, Sep. 3, 2016, Budapest, Hungary, total 5 pages.

Courtenay V. Cotton et al, Soundtrack Classification By Transient Events, ICASSP 2011, total 4 pages.

Sourish Chaudhuri et al., Unsupervised Learning of Acoustic Unit Descriptors for Audio Content Representation and Classification, INTERSPEECH 2011, 12th Annual Conference of the International Speech Communication Association, Florence, Italy, Aug. 27-31, 2011, total 5 pages.

Yu Zhang et al., Very Deep Convolutional Networks for End-To-End Speech Recognition, Oct. 10, 2016, total 5 pages.

(56) References Cited

OTHER PUBLICATIONS

International Search Report issued in corresponding International Application No. PCT/EP2018/086555, dated Jul. 24, 2019, pp. 1-12.
Sun Kai, Digital Speech Recognition Module Based on TMS320VC5409, Mar. 25, 2002, Design Applications.
Research on Audio Signal Classification Algorithm Based on Support Vector Machine and HMM, Aug. 15, 2015, pp. 369-373.
Chinese Office Action issued in corresponding Chinese Application No. 201880099051.0, dated Jul. 19, 2023, pp. 1-8.

* cited by examiner

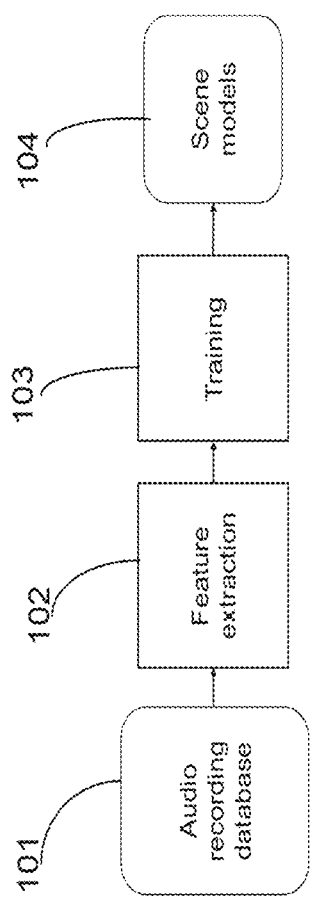
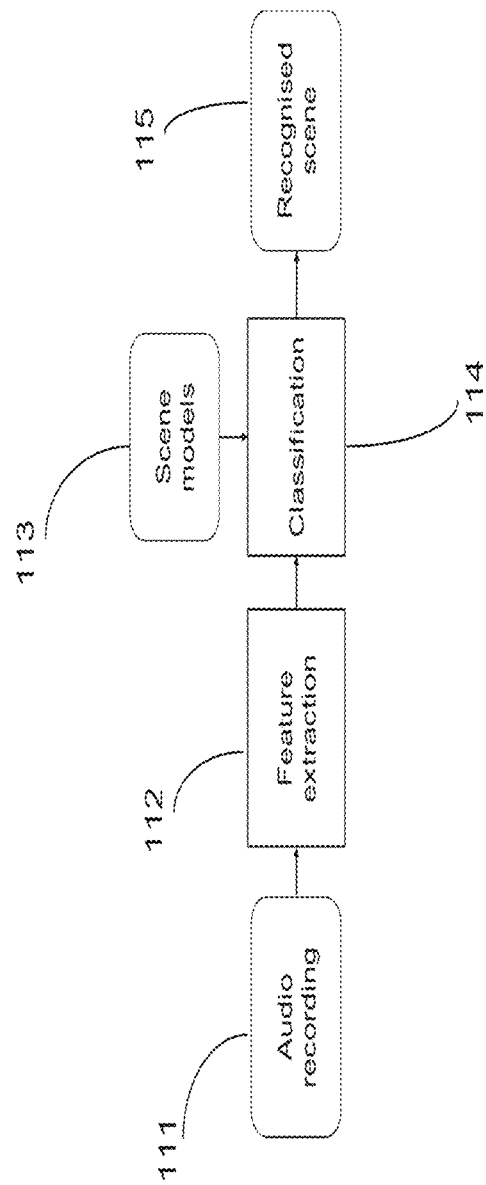
Fig. 1a
Fig. 1b

AUDIO PROCESSING APPARATUS AND METHOD FOR AUDIO SCENE CLASSIFICATION

CROSS-REFERENCE TO RELATED APPLICATIONS

This application is a continuation of International Application No. PCT/EP2018/086555, filed on Dec. 21, 2018, the disclosure of which is hereby incorporated by reference in its entirety.

TECHNICAL FIELD

Generally, the present disclosure relates to audio processing. In particular, the present disclosure relates to an audio processing apparatus for classifying an audio scene as well as a corresponding method.

BACKGROUND

Acoustic or audio scene classification (ASC) is a technology aiming at recognizing the type of an environment (car, office, street, home, restaurant, etc.) from the sound recorded at that place—the sound events occurring at the specific environment and/or the sounds that environments produce themselves. It is a task of associating a semantic label to an audio stream that identifies the environment. First, a feature vector derived from each acoustic scene in a training set is used to train a statistical model that summarizes the properties of the soundscape belonging to the same category. Then, the decision criterion is defined to assign not labelled recordings to the category that matches the distribution of their features.

The ASC process is divided into a training and a classification phase. The model training phase involves estimation of scene models 104 in terms of suitable classifiers (Support Vector Machine, SVM, Gaussian mixture model, GMM, neural networks . . . ). The model training phase 103 is done by extracting audio features 102 from each instance of the audio recording database 101, and by training the system with the known samples of all classes, as illustrated in FIG. 1a.

The classification phase uses scene models 113 obtained in the training phase and the classification phase involves extraction of the same features 112 from an audio sample. Based on these inputs, the audio sample is classified 114 into a matched class, as illustrated in FIG. 1b.

An important part of an ASC scheme is to define and extract properties that characterize a certain environment— audio features. Current ASC schemes exploit several categories of audio features, typically borrowed from speech analysis and auditory research. In strongly constrained classification scenarios, the identification of certain events can help to characterise the general environment. However, in real-life environments these approaches often suffer from one or more of the following drawbacks. The sound events are manually defined and selected. There usually is a large number of these sound events in real-life environments, and it is unrealistic to define and select all of them. It is difficult to ensure that some sound events are emerging in a specific acoustic environment and some sound events can also be heard in different acoustic environments. Thus, these current approaches are not directly applicable to a softly constrained ASC problem as the set of acoustic events characterising a certain environment is generally unbounded and extremely hard to generalise.

SUMMARY

It is an object of the disclosure to provide an improved audio processing apparatus for classifying an audio scene as well as a corresponding audio processing method.

The foregoing and other objects are achieved by the subject matter of the independent claims. Further implementation forms are apparent from the dependent claims, the description and the figures.

Generally, some embodiments merge frame-level features (e.g., log-mel spectra) with a binary feature that characterizes each frame in an input signal in terms of its affinity to the background of the acoustics scene (or background layer) or to the foreground of the acoustic scene (or foreground layer). These features can then be used in the context of a kind of "event-informed" deep neural network (DNN), wherein the main feature vectors are used as standard input features to the DNN, while the binary layer feature is employed in a more convoluted way, serving as a target in a pre-training/initialization stage and then being fed into an intermediate level of the network as a control parameter in the actual training and classification stages. Thus, embodiments of the disclosure allow improving the effectiveness of the input features by having a neural network learn to adapt according to the nature of the input frame, i.e., its affinity to the foreground or to the background of a given acoustic scene. Embodiments can be implemented as environment-aware services, for instance, in smart phones, tablets or smart wearable devices. Embodiments of the disclosure contribute to classify the environment of device through in-depth analysis of the sounds of the scenes.

According to a first aspect the disclosure relates to an audio processing apparatus configured to classify an audio signal into one or more audio scene classes, wherein the audio signal comprises a component signal. The apparatus comprises a processing circuitry configured to: classify the component signal of the audio signal as a foreground layer component signal or a background layer component signal; obtain an audio signal feature on the basis of the audio signal; select, depending on the classification of the component signal, a first set of weights or a second set of weights; and classify the audio signal, on the basis of the audio signal feature, the foreground layer component signal or the background layer component signal and the selected set of weights.

In a possible implementation, the processing circuitry is configured to classify the component signal of the audio signal as a foreground layer component signal, when the component signal of the audio signal has or comprises a short-term audio event or a long-term audio event; or classify the component signal of the audio signal as a background layer component signal, when the component signal of the audio signal has or comprises no short-term audio event and no long-term audio event.

In a possible implementation form of the first aspect, the processing circuitry is configured to classify each component signal of the audio signal which has a short-term audio event or a long-term audio event as a foreground layer component signal and classify each component signal of the audio signal which has no short-term audio event or no long-term audio event as a background layer component signal.

In a further possible implementation form of the first aspect, the processing circuitry is configured to partition the audio signal into a plurality of frames and to classify the one or more component signals of the audio signal by determining for each frame of the audio signal a complex domain difference, CDD. In this example, one frame is one component signal, or one component signal comprises at least two frames.

In mathematical analysis, a domain is any connected open subset of a finite-dimensional vector space.

In complex analysis, a complex domain (or simply domain) is any connected open subset of the complex plane. For example, the entire complex plane is a domain, as is the open unit disk, the open upper half-plane, and so forth. Often, a complex domain serves as the domain of definition for a holomorphic function.

In a further possible implementation form of the first aspect, the CDD is determined on the basis of the following equation:

$$CDD(n) = \sum_{k=-N/2}^{\frac{N}{2}-1} |X(n, k) - X_T(n, k)|,$$

wherein n denotes a frame index, k denotes a frequency bin index, X(n,k) is the kth frequency bin of the nth frame of input signal X, N denotes a frame size in samples and wherein a target spectrum $X_T(n,k)$ is defined as:

$$X_T(n,k) = |X(n-1,k)|e^{\Psi(n-1,k) + \Psi'(n-1,k)},$$

where $$\Psi(n,k) = \Psi(n,k) - \Psi(n-1,k)$$

denotes a phase difference in the k-th frequency bin between a current frame n and the previous frame n−1, T (n,k) is the phase of X(n,k).

In a further possible implementation form of the first aspect, the processing circuitry is configured to apply for each frame of the audio signal a high-pass filter to the CDD and to identify a peak in the high-pass filtered CDD as a short-term audio event. Or, the processing circuitry is configured to detect a short-term event in a component signal of the audio signal when the high-pass filtered signal comprises a peak.

In a further possible implementation form of the first aspect, the processing circuitry is configured to apply for each frame of the audio signal a low-pass filter to the CDD and to identify a long-term audio event by determining a peak in the low-pass filtered CDD. Or, the processing circuitry is configured to detect a long-term event in a component signal of the audio signal when the low-pass filtered signal comprises a peak.

In a further possible implementation form of the first aspect, the processing circuitry is configured to transform the audio signal from the time domain to the frequency domain and to obtain the one or more audio signal features from the audio signal in the frequency domain.

In a further possible implementation form of the first aspect, the one or more audio signal features comprise a log-Mel spectrum of the audio signal.

In a further possible implementation form of the first aspect, the processing circuitry is configured to provide or implement a neural network, wherein the neural network is configured to classify the audio signal on the basis of the one or more audio signal features, the one or more foreground layer component signals or the one or more background layer component signals and the selected set of weights.

In a further possible implementation form of the first aspect, the neural network comprises a first neural subnetwork and a second neural subnetwork, wherein the first neural subnetwork is configured to provide, depending on the classification of the one or more component signals, the first set of weights or the second set of weights to the second neural subnetwork and wherein the second neural subnetwork is configured to classify the audio signal on the basis of the one or more audio signal features, the one or more foreground layer component signals or the one or more background layer component signals and the selected set of weights provided by the first neural subnetwork.

According to a second aspect the disclosure relates to an audio processing method for classifying an audio signal into one or more audio scene classes, wherein the audio signal comprises a component signal. The method comprises the steps of: classifying the component signal as a foreground layer component signal or a background layer component signal; obtaining an audio signal feature on the basis of the audio signal; selecting, depending on the classification of the component signal, a first set of weights or a second set of weights; and classifying the audio signal on the basis of the audio signal feature, the foreground layer component signal or the background layer component signal and the selected set of weights.

Thus, an improved audio processing method is provided. The audio processing method according to the second aspect of the disclosure can be performed by the audio processing apparatus according to the first aspect of the disclosure. Further features of the audio processing method according to the second aspect of the disclosure correspond to or result directly from the functionality of the audio processing apparatus according to the first aspect of the disclosure and its different implementation forms described above and below.

According to a third aspect the disclosure relates to a computer program product comprising program code for performing the method according to the second aspect when executed on a computer. In an example, the program code is stored in a non-transitory memory.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIGS. 1a and 1b are schematic diagrams illustrating a conventional ASC system in a training phase and a classification phase, respectively, in accordance with some embodiments;

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 2:
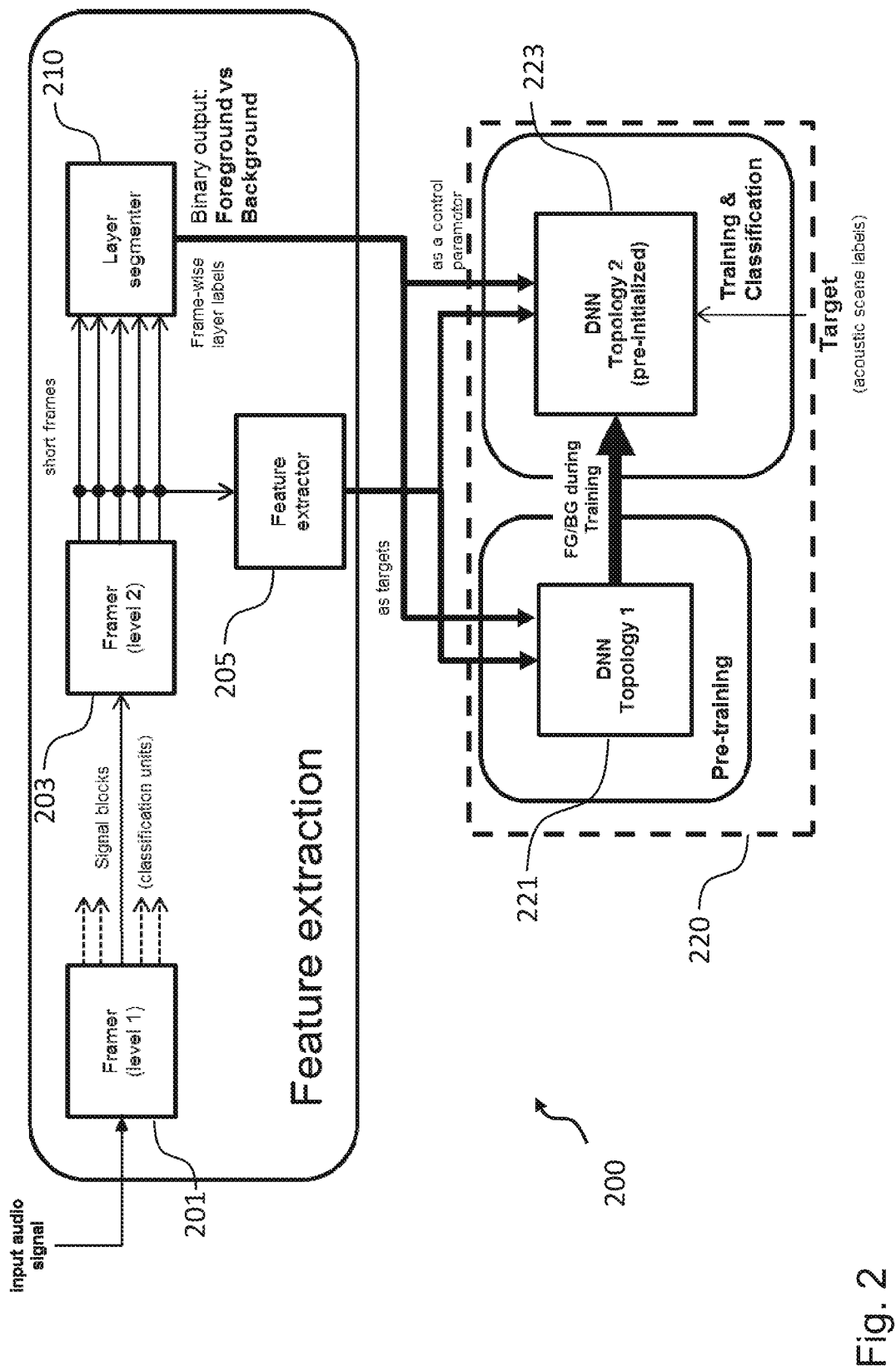
FIG. 2 is a schematic diagram showing an example of an audio processing apparatus in accordance with some embodiments.

FIG. 2 shows an audio processing apparatus 200 according to an embodiment of the disclosure. The audio processing apparatus 200 is configured to classify an acoustic scene or audio scene (both terms are used synonymously herein) defined by, i.e. associated with an audio signal into one or more audio scene classes of a plurality of audio scene classes, such as the audio scene classes car, office, street, home, restaurant, and the like. The audio signal to be classified by the audio processing apparatus 200 can comprise one or more component signals, including one or more foreground layer component signals (herein also referred to as event- or scene-related component signals) and/or one or more background layer component signals (herein also referred to as ambience-related component signals).

As will be described in more detail below, the audio signal processing apparatus 200 shown in FIG. 2 comprises a processing circuitry configured to: classify the one or more component signals of the audio signal as one or more foreground layer component signals or one or more background layer component signals, for instance, by means of the layer segmenter 210 shown in FIG. 2; obtain one or more audio signal features on the basis of the audio signal, for instance, by means of the feature extractor 205 shown in FIG. 2; select, depending on the classification of the one or more component signals, a first set of weights or a second set of weights; and classify the audio signal, on the basis of the one or more audio signal features, the one or more foreground layer component signals or the one or more background layer component signals and the selected set of weights.

As illustrated in FIG. 2, according to an embodiment the processing circuitry of the audio signal processing apparatus 200 is configured to provide a neural network 200, comprising a first neural subnetwork 221 and a second neural subnetwork 223. As will be described in more detail below, according to an embodiment the first neural subnetwork 221 is configured to provide, depending on the classification of the one or more component signals, the first set of weights or the second set of weights to the second neural subnetwork 223 and the second neural subnetwork 223 is configured to classify the audio signal on the basis of the one or more audio signal features, the one or more foreground layer component signals or the one or more background layer component signals and the selected set of weights provided by the first neural subnetwork 221.

Thus, according to embodiments of the disclosure the audio processing apparatus 200 is configured to separate event-related frames (foreground layer) of the audio signal from the rest of the audio signal (background layer) in audio recordings from every-day life environments, and to integrate this separation into foreground and background layer frames into a DNN-based acoustic scene classifier which is enhanced by the layer information. In an example, component signal refers to signal components related to foreground/background. A frame is a piece of the signal which is classified as foreground/background. Normally, a component signal contains several frames and it describes more generally the signal.

As already described above, the audio processing apparatus 200 comprises processing circuitry configured to implement a layer segmenter 210, as illustrated in the embodiment shown in FIG. 2. The layer segmenter 210, which could be implemented as a specific hardware processor and/or by means of software running on a general-purpose processor, is configured to classify the one or more component signals as one or more foreground layer, i.e. event-related component signals and/or one or more background layer, i.e. ambience-related component signals, as will be described in more detail further below in the context of FIG. 3.

In an embodiment, the feature extractor 205 may be configured to extract the one or more audio signal features from the audio signal in the frequency domain. In an embodiment, the one or more audio signal features extracted from the audio signal in the frequency domain can comprise a log-Mel spectrum of the audio signal.

In sound processing, the mel-frequency cepstrum (MFC) is for example a representation of the short-term power spectrum of a sound, based on a linear cosine transform of a log power spectrum on a nonlinear mel scale of frequency.

As will be described in more detail below, in a classification phase, the first neural subnetwork 221 is configured to provide the selected set of weights to the second neural network 223, wherein the set of weights is, depending on the classification of the one or more component signals as one or more foreground layer component signals and/or one or more background layer component signals by the layer segmenter 210, a first set of weights or a second set of weights.

Generally, the operation of the neural network 220 with its first subnetwork 221 and second subnetwork 223 can be described as follows.

As illustrated in FIG. 1, according to an embodiment the first neural subnetwork 221 can be trained using the frame-wise layer labels, i.e. the classification provided by the layer segmenter 210 as targets, which are extracted from the audio signal via layer segmentation, as will be described in more detail in the context of FIG. 3 below.

According to an embodiment, the topology of the second neural subnetwork 223 is built on top of the topology of the first neural subnetwork 221 (with initialized weights for training) and trained with backpropagation using the block-wise scene labels provided by the layer segmenter 210 as targets while also feeding the frame-wise layer labels into the neural network 220 (controlling the pooling stage).

Convolutional networks may include local or global pooling layers, which combine the outputs of neuron clusters at one layer into a single neuron in the next layer. For example, max pooling uses the maximum value from each of a cluster of neurons at the prior layer. Another example is average pooling, which uses the average value from each of a cluster of neurons at the prior layer.

In the classification stage the second neural subnetwork 223 is fed with unseen data (or not labelled, not classified) and the output corresponds to the prediction (acoustic scene label), in an example, the unseen data is the data that has not been used during training.

According to an embodiment, the audio processing apparatus 200 is configured to segment the audio signal into blocks and frames. According to an embodiment, the input audio signal is segmented by a first framer 201 of the audio processing apparatus 200 into blocks of equal length (order of a few tens of seconds) by using a windowing function, such as a Hann, Hamming or Blackmann windowing function. The result is a number of equal lengths audio blocks, e.g. 30 s. According to an embodiment, each block can then be segmented again by a second framer 203 of the audio processing apparatus 200 into (overlapping) frames of equal length (a few hundreds of samples e.g. 1024 samples). As will be appreciated, the time duration of a frame depends on the number of samples of the frame and the sample rate. For instance, for an exemplary sample rate of 16 kHz a frame of 1024 samples has a time duration of 64 ms. The frame based defined audio signal is then used in further steps of the processing chain defined by the audio processing apparatus 200, in particular by the layer segmenter 210 and the neural network 220 of the audio processing apparatus 200.

Under further reference to FIG. 3, an embodiment of the layer segmenter 210 will now be described in detail.

According to embodiments of the disclosure, audio signal feature such as low-level descriptors (LLDs) can be calculated from each frame of the audio signal. LLDs, such as spectral peak, power, spectral centroid and the like, can be calculated using conventional procedures (implemented, for instance, in the feature extractor 205 of the audio processing apparatus 200). The result is a frame based LLD used for the aggregation with segment based LLDs. In some examples, a frame based LLD means a LLD based on frames. That is based on each frame of audio data which is usually overlapping. Whereas segment based LLD is based on extracted segments (short-events/long-events/background) by the layer segmenter.

Figure 3:
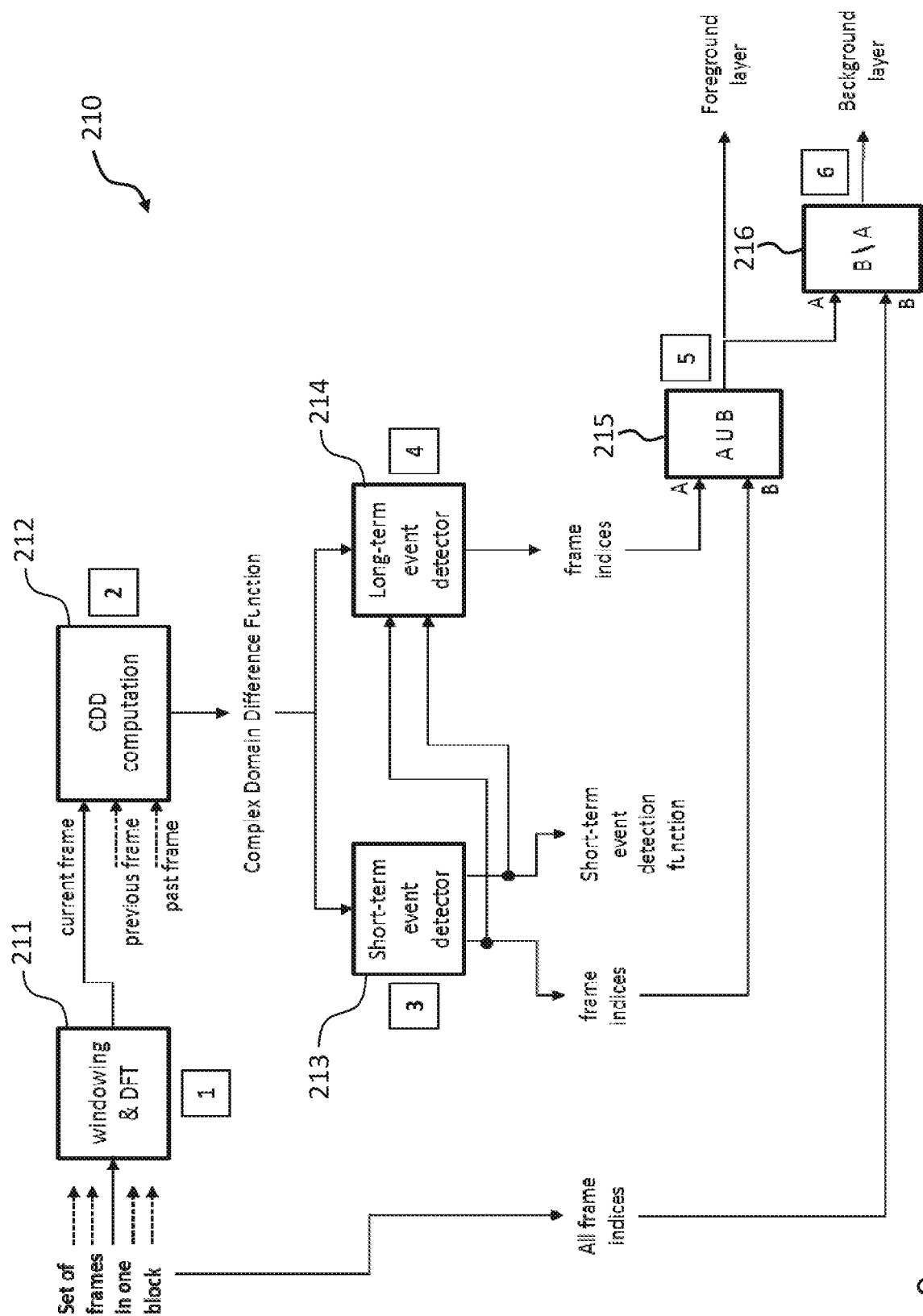
FIG. 3 is a schematic diagram illustrating in more detail a layer segmenter of an audio processing apparatus in accordance with some embodiments.

In parallel to the extractions of LLDs, the layer segmenter 210 is configured to detect short and long events by means of computing an onset detection function from the input frames (as illustrated in blocks 213 and 214 of the layer segmenter 210 shown in FIG. 3).

According to embodiments of the disclosure, short-term audio events are defined as sudden changes in the acoustic scene (drastic changes in the spectral content from one frame to the next). Thus, these short events are not necessarily impulsive events and could also be a step-like (either rising or falling) change in some aspects of the audio signal. Some examples are: door closing, cutlery noises in a kitchen, impulsive car-horn sound. In an example, sudden changes means the change happens during a very short period of time. For example, if a frame size is 1024 samples at 16 kHz sampling frequency, a sudden change will have a duration of less than 64 ms. In another example, drastic changes refer to an impulsive characteristic but not an impulse. I.e. less than 1 frame of duration.

According to embodiments of the disclosure, long-term audio events are defined as progressive (but consistent) changes in some acoustic properties that eventually get back to a steady state, after some time. Clusters of events that are not detected as short-term events but still bring a certain rate of change in the acoustic properties over a few seconds fall also into this definition. Some examples are: car passing by on the street, speech over quiet background, wind gust hitting the microphone. In an example, as opposed to short events, long events are changes that occur during several frames, long events have a longer duration.

These frames are thus labelled by the layer segmenter 210 according to layer membership, i.e. FG or BG layer. Moreover, according to further embodiments of the disclosure event-detection-related features can be obtained during this stage, which is illustrated in FIG. 3 and based on the following signal flow implemented by the layer segmenter 210.

According to an embodiment, each frame in a signal block is multiplied by an analysis window (Hann) and then Fourier-transformation is applied (processing block 211 of FIG. 3). In that way, a frequency representation of each frame is obtained.

According to an embodiment, a complex domain difference (CDD) is computed for every frame (processing block 212 of FIG. 3), resulting in a CDD time function that develops over the signal block. According to an embodiment, the layer segmenter 210 (or more specifically the processing block 212 thereof) is configured to determine for each frame of the audio signal the CDD on the basis of the following equation:

$$CDD(n) = \sum_{k=-N/2}^{\frac{N}{2}-1} |X(n,k) - X_T(n,k)|,$$

wherein n denotes the frame index, k denotes the frequency bin index, N denotes the frame size in samples and wherein the target spectrum $X_T(n,k)$ is defined as:

$$X_T(n,k) = |X(n-1,k)|e^{\Psi(n-1,k)+\Psi'(n-1,k)},$$

where $$\Psi'(n,k) = \Psi(n,k) - \Psi(n-1,k)$$

denotes the phase difference in the k-th frequency bin between the current frame n and the previous frame n−1.

According to an embodiment, the layer segmenter 210 is configured to decompose this CDD function into two components related to short-term audio (fast) events and long-term audio (slow) events by means of separating low and high frequency content.

According to an embodiment the short event detector 213 of the layer segmenter 201 can comprise a high-pass filter (configured to subtract from the CDD a (causal) median filtered version of itself) followed by a basic peak-picking algorithm that returns the time indices related to onsets of short-term audio events. The resulting signal can also be half-wave-rectified and thus the short-term audio event function can be obtained.

According to an embodiment, the long event (long-term audio event) detector 214 of the layer segmenter 210 can comprise a low-pass filter followed by a further peak-picking algorithm, which will be described in more detail in the following that returns the time indices related to the duration of long events. According to an embodiment the further peak-picking algorithm implemented by the long event detector 214 of the layer segmenter 210 operates in the following way.

First, local spikes of the CDD function are smoothed out by subtracting the short event (short-term audio event) function from the CDD function, this smoothing process is performed on those frames that were identified as belonging to short events. Then, the obtained signal is low-pass filtered in two stages (e.g. a median filter first, followed by a moving average filter), resulting in the long event function. Frames belonging to long event regions are defined in two steps: first, peaks are selected by imposing a certain relative height with respect to adjacent valleys as well as a minimum threshold (e.g. empirically chosen). This process returns one pivot frame for each detected event. The long-event regions are then grown in both time directions, starting from the pivot frame, until the long event function goes below a signal-dependent threshold. Finally, any frame that falls under both definitions of short and long events is removed from the set of long event frames.

According to an embodiment, the processing block 215 of the layer segmenter 210 shown in FIG. 3 is configured to define the foreground layer as the union of the set of frames belonging to short-term audio events and long-term audio events.

According to an embodiment, the processing block 216 of the layer segmenter 210 shown in FIG. 3 is configured to define the background layer as the relative complement of the foreground layer in the set of all frames. In other words, everything that does not fall into the definition of short-term and long-term events.

Figure 4:
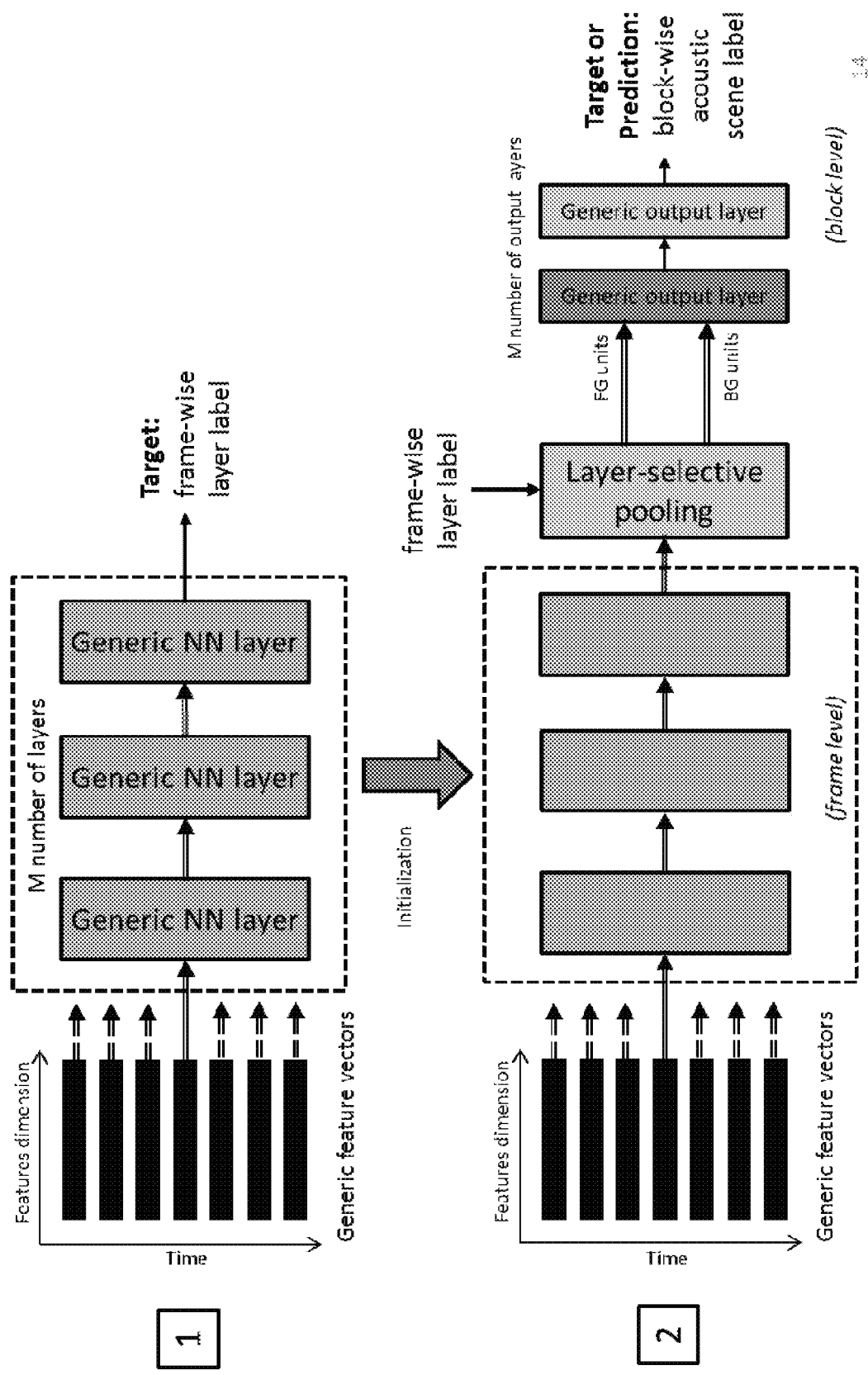
FIG. 4 is a schematic diagram illustrating in more detail different aspects of a neural network implemented by an audio processing apparatus in accordance with some embodiments.

FIG. 4 is a schematic diagram illustrating the neural network 220 implemented by the audio processing apparatus 200 according to an embodiment of the disclosure. In a pre-training phase or a first stage of the training phase the first neural subnetwork 221 is trained to tell foreground frames from background frames, as already described above. In this way, the optimal set of weights in the hidden layers are learned during this process. In a second stage of the training phase the topology of the second neural subnetwork 223 is trained to classify signal blocks given their target acoustic scene labels. The frame-wise layer label is fed into the second neural subnetwork 223 as a binary control parameter for layer-selective pooling.

Figure 5:
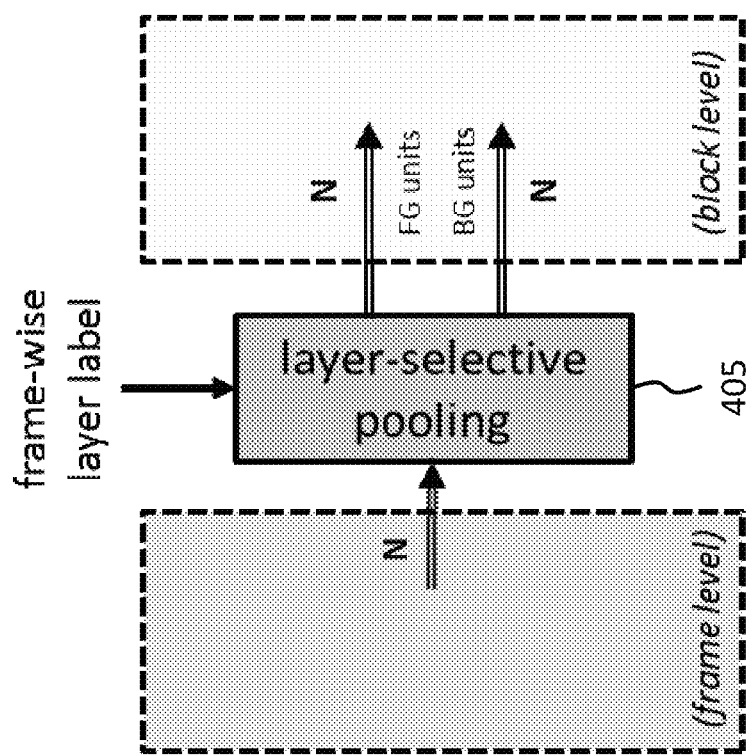
FIG. 5 is a schematic diagram illustrating in more detail a layer selective pooling performed by a neural network implemented by an audio processing apparatus in accordance with some embodiments.

FIG. 5 is a schematic diagram illustrating in more detail the layer selective pooling performed by the neural network 220, in particular the second neural subnetwork 223 implemented by the audio processing apparatus 200 according to an embodiment of the disclosure. Given N units at the output of the last frame-level network layer, the layer-selective pooling stage can perform the pooling twice, selectively on the units that belong to the foreground (FG) and background (BG) layers, as illustrated in FIG. 5. As a result, the pooling stage outputs 2N units, half of which is related to the foreground, and the remaining half is related to the background. From this stage onwards, the information has a temporal resolution that corresponds to the block level, and the actual distinction between foreground and background is implicitly embedded in the order of the 2N units after the pooling stage.

As already described above, in the classification phase the topology of the second neural subnetwork 223 is built on top of the topology of the first neural subnetwork 221. During training the output of the first neural subnetwork 221 is binary, i.e. foreground or background (see "FG/BG during Training" in FIG. 2). In the classification phase, on the other hand, the first neural subnetwork 221 and the second neural subnetwork 223 are combined in that the last layer of the first neural subnetwork 221 is removed and operates as hidden layer activations with initialized weights. The second neural subnetwork 223 is then fed with unseen data and predicts the acoustic scene, e.g. car, office, train, etc.

In the following further embodiments of the audio processing apparatus 200, the layer segmenter 210 and the neural network 220 will be described in more detail.

Embodiments of the disclosure can be run using a set of audio signals (e.g. uncompressed audio, 16 kHz sampling rate, 16 bit) that preferably share the same length of 30 seconds, and thus they already represent the signal blocks. This means that in such an implementation of the audio processing apparatus 200 the first framing stage shown 201 shown in FIG. 2 is not necessary.

According to embodiments of the disclosure, the second framing stage (implemented by processing block 203 of FIG. 2) can be performed at two levels of temporal resolution: a finer resolution (64 ms frames with a 50% overlap) for the layer segmenter 210, and a coarser resolution (200 ms frames with 50% overlap) for the feature extractor 205. These different resolutions can be advantageous in that, while the finer resolution gives better results in terms of layer segmentation (especially in relation to the detection of isolated short-term events), it unfortunately casts a prohibitive computational load for standard computational resources when it comes to training the neural network topologies. On the other hands, it was found that longer time windows usually give slightly better results in terms of classification with the neural network. Thus, before using the layer information in the system, the frame labels given by the layer segmenter 210 can be downsampled in order to match the resolution of the feature extraction process implemented by the feature extractor 205 so that the whole system eventually works with the coarser resolution.

According to an embodiment, the layer segmenter 210 is configured to receive the input audio signals as WAV files and to output CSV files with the frame-wise layer information. According to embodiments of the disclosure, the some or more steps of the following algorithm can be implemented by the layer segmenter 210:

Load audio file into memory buffer
Compute complex spectrogram from audio signal (magnitude and phase): For each frame:
    Apply Hann window
    Compute FFT
    Convert spectrum from rectangular to polar coordinates Compute CDD function from spectrogram
Compute short-term event function:
    Apply causal median filter to CDD function→"smooth" CDD function
    Subtract smooth CDD function from original CDD function→short-term event function
Detect short-term audio events by picking peaks in short-term event function
Expand short-event frame regions: For each frame associated to a short-term event:
    Add 1 frame to the left and 3 frames to the right to the pool of frames associated to the short-term events
Compute long-term event function: For each frame associated to short-term events:
    Subtract short-term event function from original CDD function→auxCDD function
    Apply median filter to the auxCDD function (in-place)
    Apply forward-backward moving average filter to auxCDD function→long-term event function (LEF)
Identify frames belonging to long-term events:
    Select peaks in the LEF based on difference in height between each relative maximum and adjacent valleys: when differences are low compared to the median value of the function over the whole signal, only the highest maximum of the group of similar-height maxima is actually selected as a true peak (empirical thresholds apply).
    For each pair of true peaks: consider the lowest valley, so that two well-defined valleys are obtained around each true peak (one behind and one ahead of it): g1 and g2 are the differences in height between the peak and the two valleys.
    For each peak of height h, compute a new threshold $t = h - \min(g1, g2)$ and grow the long-term event region in both time directions until the LEF falls below t (local maxima can be trespassed).
Compute union set from the sets of frames related to short-term audio events and long-term audio events (foreground layer).
Compute background layer as the set of frames complementary to the foreground layer.

The feature extraction implemented by the feature extractor 205 can be based on a TensorFlow implementation, and can comprise computing the Log-Mel spectra of input frames (using e.g. 128 mel-frequency bins).

According to embodiments of the disclosure, the classification scheme provided by the neural network 220 can be based on available platforms for machine learning, such as the TensorFlow implementation that describes and trains the presented neural network topologies. The TensorFlow program implementing the neural network 220 receives the same WAV audio files previously analysed by the layer segmenter 210, and it is also fed with the CSV files containing the acoustic layer information.

Figure 6:
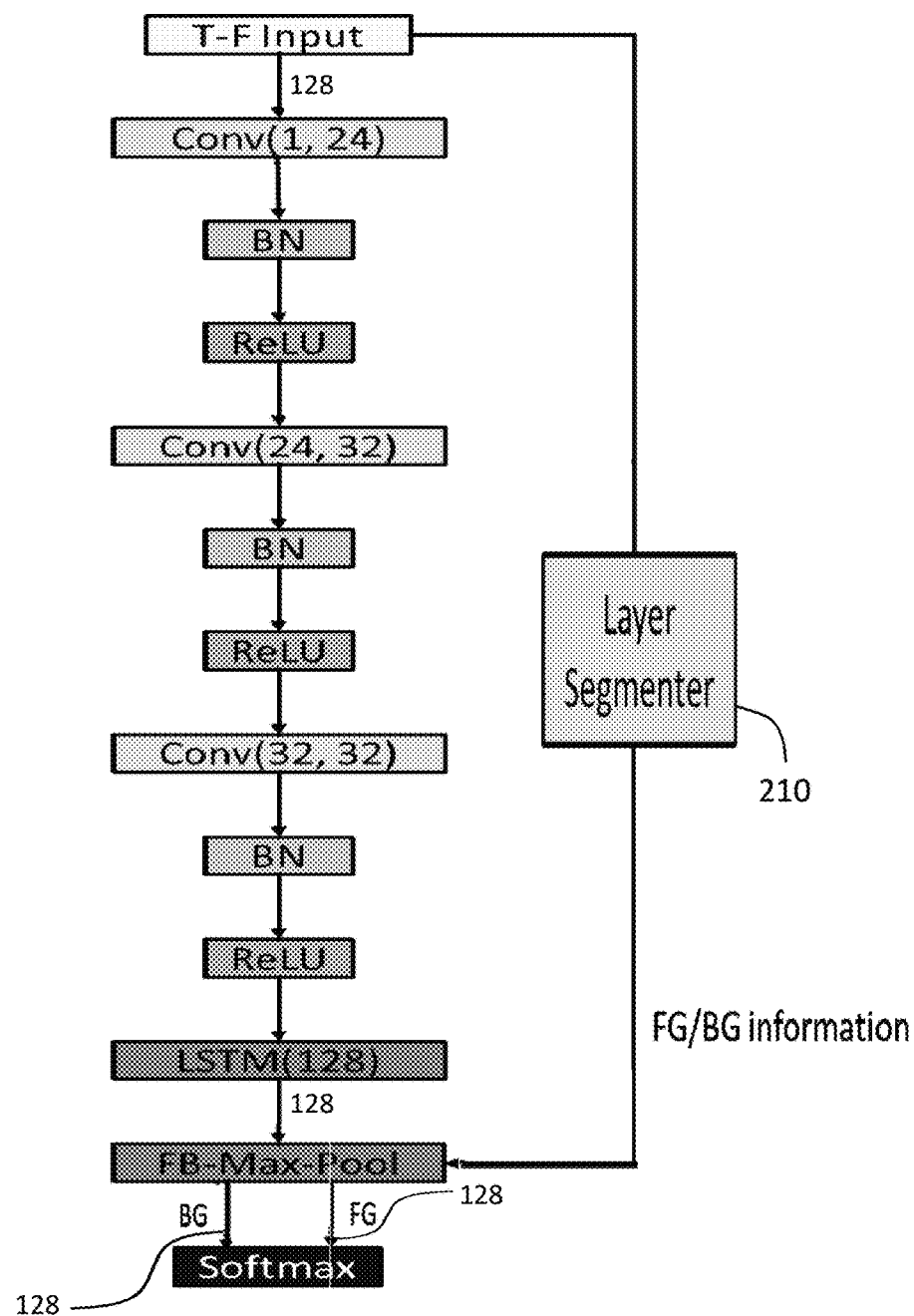
FIG. 6 is a schematic diagram illustrating an example of a neural network architecture implemented by an audio processing apparatus in accordance with some embodiments.
Figure 7:
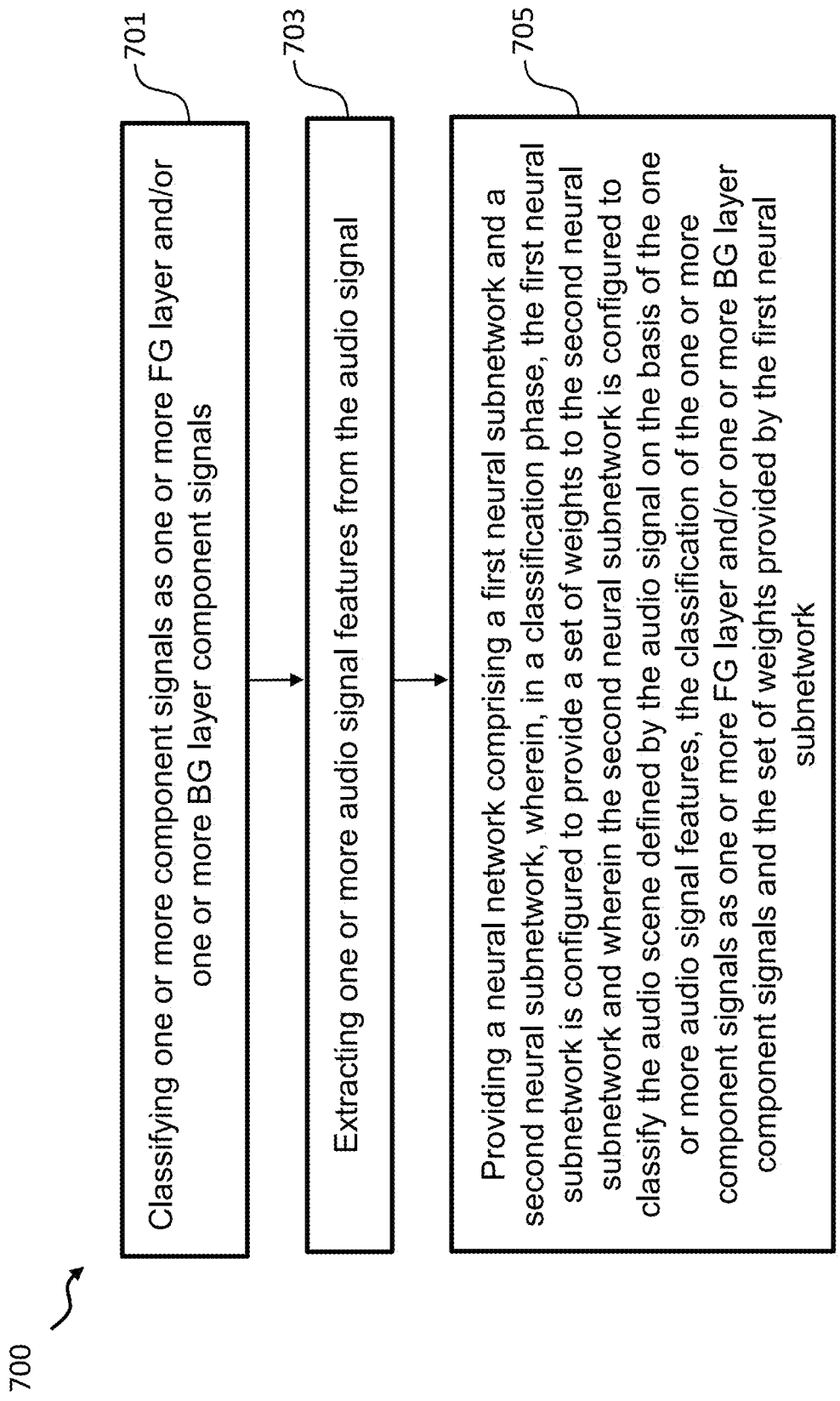
FIG. 7 is a flow diagram showing an example of an audio processing method in accordance with some embodiments.

An exemplary architecture of the neural network 220 in combination with the layer segmenter 210 is shown in FIG. 6. The architecture consists of 3 convolution layers Conv(..) and one layer Long-short term memory (LSTM) Recurrent neural networks (RNN), Batch normalization (BN) is always applied before the rectified linear unit (ReLu) activation for each convolution layer. The details on the architecture are given as follows:
    Layer 1: Conv(1, 24, 3, 3, 1, 1)
    Layer 2: Conv(24, 32, 3, 3, 1, 1)
    Layer 3: Conv(32, 32, 3, 3, 1, 1)
    Layer 4: LSTM(128)
    Layer 5: Foregroud an Backgroud selective Max Pooling along time
    Layer 6: Softmax Layer FIG. 7 is a flow diagram showing an example of a corresponding audio processing method 700 according to an embodiment of the disclosure. The method 700 comprises the steps of: classifying 701 the one or more component signals as one or more foreground layer component signals and/or one or more background layer component signals; obtaining 703 one or more audio signal features on the basis of the audio signal; selecting, depending on the classification of the one or more component signals, a first set of weights or a second set of weights; and classifying the audio signal on the basis of the one or more audio signal features, the one or more foreground layer component signals and/or the one or more background layer component signals and the selected set of weights.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely a logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected to achieve the objectives of the solutions of the embodiments.

In addition, functional units in the embodiments of the present disclosure may be integrated into one processing unit, or each of the units may exist alone physically, or two or more units are integrated into one unit.

The invention claimed is:

1. An audio processing apparatus configured to classify an audio signal into one or more audio scene classes, the audio signal comprising a component signal, wherein the apparatus comprises a processing circuitry configured to:
    classify the component signal of the audio signal in a classification as one of a foreground layer component signal or a background layer component signal;
    obtain an audio signal feature based on the audio signal;
    select one of a first set of weights or a second set of weights based on the classification of the component signal; and
    classify the audio signal on a basis of the audio signal feature, the foreground layer component signal or background layer component signal, and the selected one of the first set of weights or the second set of weights.

2. The apparatus of claim 1, wherein the processing circuitry is configured to:

classify the component signal of the audio signal as the foreground layer component signal, when the component signal of the audio signal has at least one of a short-term audio event or a long-term audio event; and
classify the component signal of the audio signal as the background layer component signal when the component signal of the audio signal has no short-term audio event and no long-term audio event.

3. The apparatus of claim 2, wherein the processing circuitry is configured further configured to partition the audio signal into a plurality of frames, wherein the processing circuitry is further configured to classify the component signal of the audio signal by determining for each frame of the audio signal a complex domain difference (CDD).

4. The apparatus of claim 3, wherein the CDD is determined on a basis of the following equation:

$$CDD(n) = \sum_{k=-N/2}^{\frac{N}{2}-1} |X(n,k) - X_T(n,k)|,$$

wherein n denotes a frame index, k denotes a frequency bin index, N denotes a frame size in samples and wherein a spectrum X_T (n,k) is defined as:

$X_T(n,k) = |X(n-1,k)|e^{\Psi(n-1,k)+\Psi'(n-1,k)},$ where $\Psi'(n,k) = \Psi(n,k) - \Psi(n-1,k)$ denotes a phase difference in a k-th frequency bin.

5. The apparatus of claim 4, wherein the processing circuitry is configured to apply for each of the frames of the audio signal a low-pass filter to the CDD and to identify the long-term audio event by determining a peak in a low-pass filtered CDD.

6. The apparatus of claim 3, wherein the processing circuitry is configured to apply for each of the frames of the audio signal a high-pass filter to the CDD and to identify a peak in a high-pass filtered CDD as the short-term audio event.

7. The apparatus of claim 1, wherein the processing circuitry is configured to transform the audio signal from a time domain to a frequency domain and to obtain the audio signal feature from the audio signal in the frequency domain.

8. The apparatus of claim 7, wherein the audio signal feature comprise a log-Mel spectrum of the audio signal.

9. The apparatus of claim 1, wherein the processing circuitry is configured to provide a neural network, wherein the processing circuitry is configured to classify the audio signal by implementing the neural network.

10. The apparatus of claim 9, wherein the neural network comprises a first neural subnetwork and a second neural subnetwork, wherein the first neural subnetwork is configured to provide, depending on the classification of the component signal, the first set of weights or the second set of weights to the second neural subnetwork and wherein the second neural subnetwork is configured to classify the audio signal on the basis of the audio signal feature, the foreground layer component signal or the background layer component signal and the selected one of the first set of weights or the second set of weights provided by the first neural subnetwork.

11. An audio processing method for classifying an audio signal into one or more audio scene classes, the audio signal comprising a component signal, wherein the method comprises:

classifying the component signal in a classification as one of a foreground layer component signal or a background layer component signal;
obtaining audio signal features on a basis of the audio signal;
selecting one of a first set of weights or a second set of weights based on the classification of the component signal; and
classifying the audio signal on a basis of an audio signal feature, the foreground layer component signal or background layer component signal, and the selected one of the first set of weights or the second set of weights.

12. The method of claim 11, wherein classifying the component signal as the foreground layer component signal or the background layer component signal comprises:
classifying the component signal of the audio signal as the foreground layer component signal, when the component signal of the audio signal has at least one of a short-term audio event or a long-term audio event; and
classifying the component signal of the audio signal as the background layer component signal when the component signal of the audio signal has no short-term audio event and no long-term audio event.

13. The method of claim 12, wherein the method further comprises:
partitioning the audio signal into a plurality of frames, and wherein the component signal of the audio signal comprises determining for each frame of the audio signal a complex domain difference (CDD).

14. The method of claim 13, wherein the CDD is determined on a basis of the following equation:

$$CDD(n) = \sum_{k=-N/2}^{\frac{N}{2}-1} |X(n,k) - X_T(n,k)|,$$

wherein n denotes a frame index, k denotes a frequency bin index, N denotes a frame size in samples and wherein a spectrum X_T (n,k) is defined as:

$X_T(n,k) = |X(n-1,k)|e^{\Psi(n-1,k)+\Psi'(n-1,k)},$ where $\Psi'(n,k) = \Psi(n,k) - \Psi(n-1,k)$ denotes a phase difference in a k-th frequency bin.

15. The method of claim 14, wherein the method further comprises:
applying for each of the frames of the audio signal a low-pass filter to the CDD and to identify the long-term audio event by determining a peak in a low-pass filtered CDD.

16. The method of claim 13, wherein the method further comprises:
applying for each of the frames of the audio signal a high-pass filter to the CDD and to identify a peak in a high-pass filtered CDD as the short-term audio event.

17. The method of claim 11, wherein the obtaining the audio signal features on the basis of the audio signal comprises:
transforming the audio signal from a time domain to a frequency domain and to obtain the audio signal feature from the audio signal in the frequency domain.

18. The method of claim 17, wherein the audio signal feature comprise a log-Mel spectrum of the audio signal.

19. The method of claim 11, wherein the method further comprises:

providing a neural network wherein classifying the audio signal is performed by implementing the neural network.

20. A computer program product comprising a non-transitory computer readable medium program code for performing a method, wherein the method comprises:
- classifying a component signal in a classification as one of a foreground layer component signal or a background layer component signal;
- obtaining audio signal features on a basis of an audio signal;
- selecting one of a first set of weights or a second set of weights based on the classification of the component signal; and
- classifying the audio signal on a basis of an audio signal feature, the foreground layer component signal or background layer component signal, and the selected one of the first set of weights or the second set of weights.

* * * * *

UNITED STATES PATENT AND TRADEMARK OFFICE
CERTIFICATE OF CORRECTION

PATENT NO. : 11,776,532 B2
APPLICATION NO. : 17/348129
DATED : October 3, 2023
INVENTOR(S) : Yesenia Lacouture Parodi It is certified that error appears in the above-identified patent and that said Letters Patent is hereby corrected as shown below:

In the Specification

Column 3, Lines 30-32, which should be replaced with:
"denotes a phase difference in the $k$-th frequency bin between a current frame $n$ and the previous frame $n-1$, $\Psi(n, k)$ is the phase of X(n,k)."

In the Claims

Column 13, Lines 22-25 (Claim 4), which should be replaced with:
"wherein $n$ denotes a frame index, $k$ denotes a frequency bin index, $N$ denotes a frame size in samples and wherein a spectrum $X_T(n,k)$ is defined as:"

Column 14, Lines 37-39 (Claim 14), which should be replaced with:
"wherein $n$ denotes a frame index, $k$ denotes a frequency bin index, $N$ denotes a frame size in samples and wherein a spectrum $X_T(n,k)$ is defined as:"

Signed and Sealed this
Twenty-first Day of November, 2023

Katherine Kelly Vidal
*Director of the United States Patent and Trademark Office*